126,918

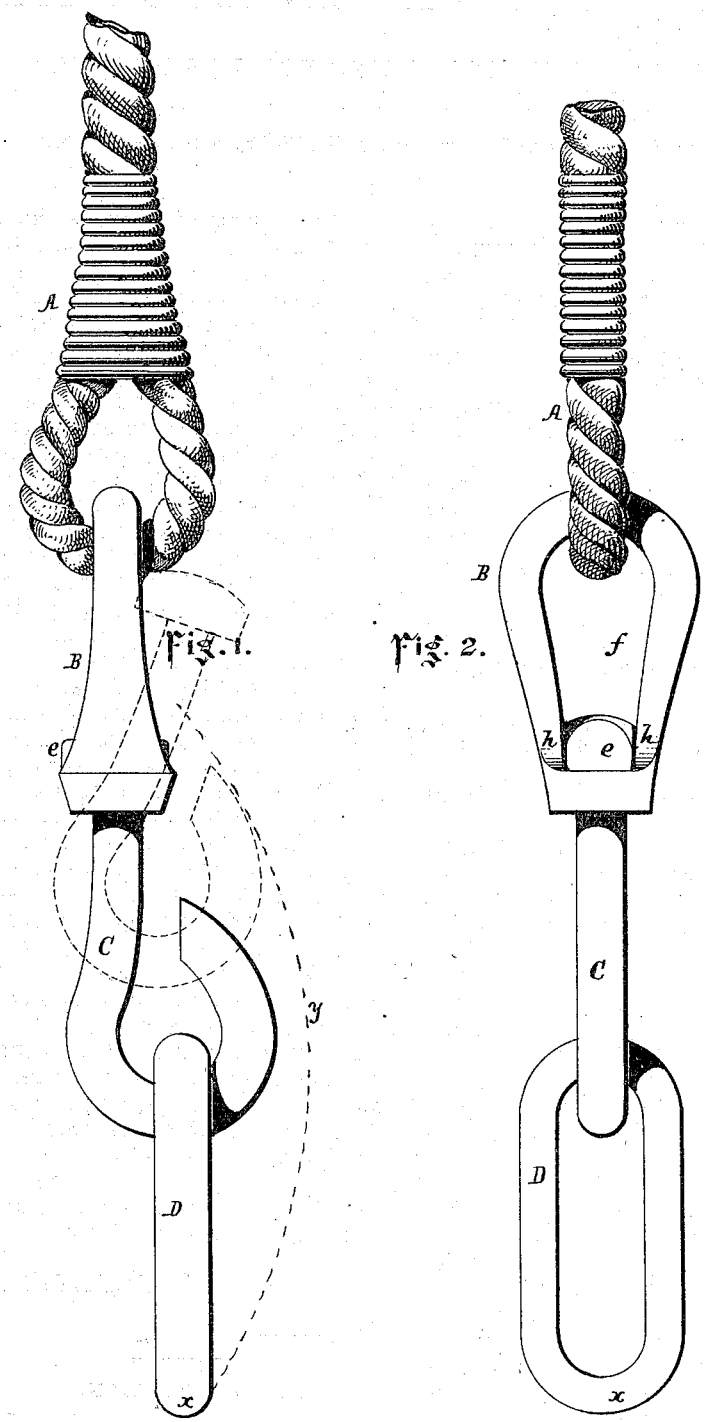

UNITED STATES PATENT OFFICE.

HENRY BADCOCK, OF PITTSBURG, PENNSYLVANIA.

IMPROVEMENT IN COUPLINGS FOR ROPE-BANDS.

Specification forming part of Letters Patent No. 126,918, dated May 21, 1872.

*To all whom may it concern:*

Be it known that I, HENRY BADCOCK, of Pittsburg, in the county of Allegheny and State of Pennsylvania, have invented a certain new and useful Improvement in Band-Rope Coupling; and I do hereby declare that the following is a full, clear, and exact description thereof, reference being had to the accompanying drawing and to the letters of reference marked thereon.

The nature of my invention consists in providing the "band-rope" of the driving-pulley used in connection with machinery for manipulating the drilling-tools, and other apparatus connected with the boring of oil-wells, with a coupling consisting of a yoke, hook, and link, constructed, arranged, and operating with relation to each other, substantially as hereinafter described.

To enable others skilled in the art to make and use my improvement, I will proceed to describe its construction and operation.

In the accompanying drawing which forms part of this specification, Figure 1 is a side view of my improvement in coupling for "band-rope." Fig. 2 is a face or front view of the same.

A represents the band-rope, one end of which is attached to the yoke B, as indicated in Figs. 1 and 2, the other end being attached in like manner to the end $x$ of the link D. The hook C is provided with a T-head, $e$, which fits in between the bow of the yoke B at the point marked $h$. The opening $f$ of the bow of the yoke B is of such size and form that the hook C may be uncoupled from the yoke by passing the T-head of the hook C out through the opening $f$, as indicated by the dotted lines in Fig. 1, and by turning the end $x$ of the link D up toward the yoke B, as indicated by the dotted curved line $y$, the hook C may be entirely detached from the yoke B.

The operation of uncoupling will be readily comprehended by those skilled in the art of manipulating the tools and apparatus connected with the boring of oil-wells without further suggestion by prolix description.

In the boring of oil-wells the driving and operating machinery is exposed to the weather, and it has been found by experience that the ordinary leather belting at times, becoming wet by the dew and rain stretches, and is thereby rendered inoperative, and being exposed to the action of the sun becomes crisped and cracked. These difficulties have caused persons engaged in the boring of oil-wells to use what is known as a sheave driving-wheel, frequently called the "bull-wheel," and instead of the leather belting, they use a rope which is less objectionable, as it is not so easily injured by the action of the dews and rains, or the heat of the sun, the greatest difficulty being its liability to stretch, requiring it to be shortened frequently, by taking a piece out of the band-rope, which operation necessitates "seizing," or whipping the ends together with a cord, causing a loss of time and labor.

The object of my improvement is to avoid these difficulties, which I accomplish by the use of a coupling, constructed as hereinbefore described, which, when the band-rope becomes stretched, can readily be uncoupled, and, by twisting the rope, it can be shortened up so as to bring it to the required length, which operation of uncoupling and twisting of the band-rope can be done with great facility and ease, and with but little loss of time, which are great considerations with men engaged in the boring of oil-wells.

Having thus described the nature, construction, operation, and advantages of my improvement, what I claim as my invention is—

The combination of the yoke B, hook C, and link D with the band-rope A, constructed, arranged, and operated with relation to each other, substantially as hereinbefore described, and for the purpose set forth.

HENRY BADCOCK.

Witnesses:
A. C. JOHNSTON,
JAMES J. JOHNSTON.